United States Patent [19]

Rosenquist

[11] Patent Number: 4,622,379
[45] Date of Patent: Nov. 11, 1986

[54] POLYESTERCARBONATE FROM AMIDE SUBSTITUTED AROMATIC DICARBOXYLIC ACID

[75] Inventor: Niles R. Rosenquist, Evansville, Ind.

[73] Assignee: General Electric Company, Mt. Vernon, Ind.

[21] Appl. No.: 657,897

[22] Filed: Oct. 5, 1984

[51] Int. Cl.$^4$ ............................................. C08G 63/62
[52] U.S. Cl. ..................................... 528/176; 528/184; 528/190; 562/450; 562/453; 562/455
[58] Field of Search ........................ 528/176, 190, 184

[56] References Cited

U.S. PATENT DOCUMENTS 4,465,820  8/1984  Miller et al. ......................... 528/176

Primary Examiner—Harold D. Anderson
Attorney, Agent, or Firm—Martin B. Barancik

[57] ABSTRACT

A composition comprising an aromatic copolyester-carbonate having flexural modulus, flexural yield and secondary transition temperature improvement over a corresponding aromatic polycarbonate effective amount of ester units of the structure

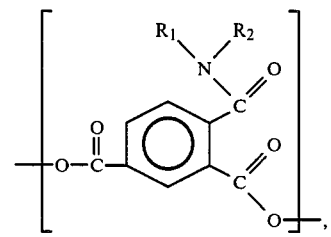

FIG. 1

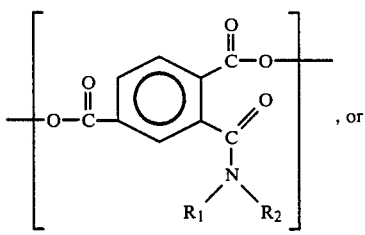

FIG. 2 or mixtures of the above two structures wherein $R_1$ and $R_2$ are the same or different and are alkyl of one to six carbon atoms, inclusive, cycloalkyl of four to seven carbon atoms, inclusive, phenyl, one to three alkyl substituted phenyl each alkyl having one to three carbon atoms, inclusive, and $R_1$ and $R_2$ taken together with the nitrogen to which they are attached form a ring of four to six carbon atoms, inclusive, or carbazole.

10 Claims, No Drawings

POLYESTERCARBONATE FROM AMIDE SUBSTITUTED AROMATIC DICARBOXYLIC ACID

BACKGROUND OF THE INVENTION

Aromatic polycarbonates having relatively high modulus, flexural strength and secondary transition temperatures are well known in the art. One of the methods known of raising the secondary transition temperature of polycarbonates while substantially maintaining a significant number of the other properties of polycarbonate is to incorporate a significant number of ester bonds, particularly aromatic ester bonds. In this manner, a copolyestercarbonate is produced, see Goldberg U.S. Pat. No. 3,169,121 incorporated by reference. Copolyestercarbonate with relatively high secondary transition temperatures are known, see Miller U.S. Pat. No. 4,465,820 and U.S. Pat. No. 4,464,512, for example. However, none of these disclosures appear to mention the effect of having a substituent on the aromatic ester ring other than the usual "hydrocarbyl", "chloro", "alkyl", etc. groups.

A substantially sized, double heteroatom group has now been placed into the backbone of a copolyestercarbonate, the substantially sized double heteroatom group functioning as a side group instead of joining one repeating unit to another. This group provides a high flexural modulus as well as a high secondary transition temperature with fewer ester units than necessary in prior copolyestercarbonates.

SUMMARY OF THE INVENTION

In accordance with the invention, there is a composition comprising an aromatic copolyestercarbonate having flexural modulus, flexural yield and secondary transition temperature improvement over a corresponding aromatic polycarbonate effective amount of ester units of the structure

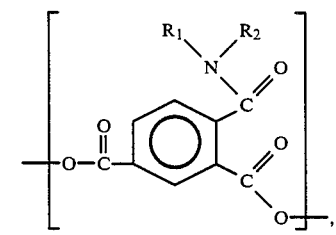

FIG. 1

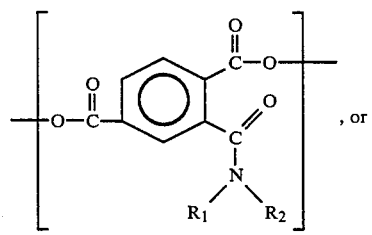

FIG. 2

, or or mixtures of the above two structures wherein $R_1$ and $R_2$ are the same or different and are alkyl of one to six carbon atoms, inclusive, cycloalkyl of four to seven carbon atoms, inclusive, phenyl, one to three alkyl substituted phenyl each alkyl having one to three carbon atoms, inclusive, and $R_1$ and $R_2$ taken together with the nitrogen to which they are attached form a ring of four to six carbon atoms, inclusive, or carbazole.

DETAILED DESCRIPTION OF THE INVENTION

The copolyestercarbonates of this invention are prepared by reacting a dihydric phenol with a carbonate precursor and the aromatic ester precursor. The dihydric phenols employed in the preparation of the copolyestercarbonate are those typically used and are illustratively exemplified below 2,2-bis(4-hydroxyphenyl)propane;
bis(4-hydroxyphenyl)methane;
2,2-bis(4-hydroxy-3-methylphenyl)propane;
4,4-bis(4-hydroxyphenyl)heptane;
2,2-(3,5,3'-5'-tetrachloro-4,4'-dihydroxylphenyl) propane;
2,2-(3,5,3',5'-tetrabromo-4,4'-dihydroxydiphenyl) propane;
(3,3'-dichloro-4,4'-dihydroxyphenyl)methane.

Other dihydric phenols which are also suitable for use in the preparation of the above polycarbonates are disclosed in U.S. Pat. Nos. 2,999,835; 3,028,365; 3,334,154 and 4,131,575.

The carbonate precursors are the usual ones, phosgene preferred, as set out in U.S. Pat. Nos. 4,018,750 and 4,123,436, interfacial process or those used in transesterification processes as in U.S. Pat. No. 3,153,008.

The aromatic precursors of the amide containing unit of the polymer are set forth below:

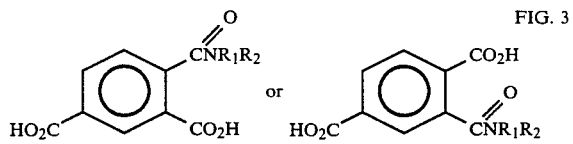

FIG. 3 or mixtures of both of these structures.

These amide substituted iso and terephthalic acids of FIG. 3 are prepared by reacting 1,2,4-benzene tricarboxylic anhydride, also known as trimellitic anhydride

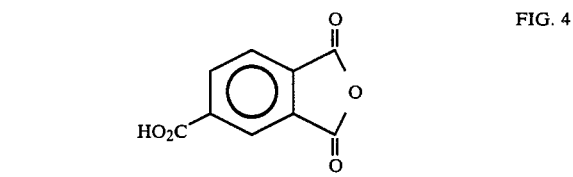

FIG. 4 at an elevated temperature followed by aqueous acid work up. The temperature used for the reaction can vary from about 110° to 175° C. Reaction time is not critical and can vary from about 8 to 16 hours. The monomers represented in FIG. 3, $R_1R_2$ as previously defined, are novel compounds and are a further aspect of this invention. As used in $R_1$ and $R_2$ the phrase "alkyl of one to six carbon atoms, inclusive", includes normal and branched groups including inter alia methyl, ethyl, isopropyl, n-butyl, tert.butyl, neopentyl and isohexyl. Branched alkyl groups are preferred.

The preparation of the copolyestercarbonate of this invention can proceed by the usual known procedure. However, wherein certain of the monomers of FIG. 3 are slow in incorporating into the chain as evidenced by low intrinsic viscosity values or a low maximum level of incorporation, slight modification of the usual reaction procedure are necessary.

Typical reaction procedures that are employed are the mixing together of the dihydric phenol, endcapping agent (usually phenol or p.tert.butylphenol) and then phosgenating the reaction vessel for a specified period of time, usually providing 10 to 20% more phosgene than theoretically necessary for total phosgenation in the usual type of interfacial polymerization. This polymerization uses aqueous alkaline pH and methylene chloride in the reaction procedure. As the mole percent amide monomer incorporation goes upward to the 50 to 60 mole percent, the presence of a chain stopper is found to be essentially unnecessary since the reaction rate of incorporation of the amide appears to be controlled by the reaction conditions. It has been found that better resin can generally be obtained by dividing the quantity of dihydric phenol into several portions. The initial portion being present with all the amide monomer and the remainder of the dihydric phenol added part way through the phosgenation. Generally this somewhat modified interfacial polymerization procedure will provide better resin than the standard procedure as measured by physical properties and purity. Although not understood completely it is believed that the resin formation reactions are essentially a competition between two reaction sequences, one leading to an ester unit and one to a carbonate unit.

The preparation of the copolyestercarbonate has been exemplified alone as a reaction between a dihydric phenol, a carbonate precursor, and an amide containing aryl diester precursor. Obviously more than one dihydric phenol can be present in the molecule, the preferred one being bisphenol-A. It is also appropriate to have another aryl diester precursor present such as ordinary isophthalic acid, terephthalic acid, acid chlorides of either acid or mixtures of both iso and terephthalic acid and their acid chlorides.

The amount of amide monomer, i.e. FIG. 3, in the copolyestercarbonate will generally vary from about 5 to about 60 mole percent based on the moles of dihydric phenol present. Preferred amounts are from about 10 to 50 mole percent.

Below are examples of the invention. These examples are intended to exemplify the broad nature of the invention rather than narrow it.

PREPARATION OF THE AMIDE SUBSTITUTED ACIDS OF FIG. 3

Preparation A—Mono diphenyl amide of 1,2,4-benzene tricarboxylic acid (FIG. 3, $R_1$ and $R_2$ are phenyl)

192 g (1.0 mole) of 1,2,4-benzenetricarboxylic anhydride (Aldrich) and 169 g (1.0 mole) diphenyl amine (Eastman Reagent) were mixed in a 1000 ml 3-neck flask fitted with a mechanical stirrer and with a condenser capped with a drying tube. The flask was warmed in a 90° C. oil bath until the diphenyl amine was melted. To the flask was then added 250 g (2.5 mole, dried over 4 $A^0$ molecular sieves) triethyl amine. The temperature was raised to 110° C. and then to 120° C. After 3 hours vigorous stirring, the reaction mixture had become a thick brown melt. After 8 hours reaction time, the heat was turned down to about 80° C. for 16 hours (overnight) then turned back to 120° C. for one hour. An ir spectrum of the reaction mixture indicated negligible residual anhydride and strong amide and carboxylate salt groups absorbances. Excess triethyl amine that had collected on top of the reaction mixture was poured off. Then 375 ml distilled water was added to the hot melt to yield a clear brown solution. The solution was filtered into a 4000 ml Erlenmeyer flask, diluted with 1000 ml acetone, acidified to pH <1 with conc. aq. HCl (about 150 ml). The solution was split into two equal portions and each portion diluted to 4000 ml with water to yield a granular precipitate. The precipitate was collected by vacuum filtration and any large lumps broken up, then washed 2× with 2000 ml water (pH of second wash was 4 to 5). After drying in a 45° C. vacuum oven, a pale yellow powder was obtained. ir 1710 cm$^1$, 1650 cm$^1$ (shoulder), 1595 cm$^1$. This powder is suitable for use directly in resin preparation.

The following amides were prepared in essentially the same manner as the diphenyl amide of preparation A.

Preparation B—Carbazole derived amide (FIG. 3, $R_1$ and $R_2$ taken together with nitrogen to which they are attached form a carbazole)

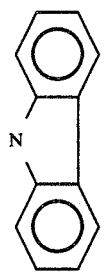

FIG. 6

The initial reaction product (the bis triethylammonium salt of FIG. 3; N,$R_1$ and $R_2$ as shown in FIG. 6) appeared to partially crystallize as the reaction proceeded. A nearly solid reaction mixture resulted which could not be stirred and was not soluble in water. It was acidified as an aqueous slurry instead of in solution. Subsequent workup was the same as for A: ir 1700 cm$^{-1}$, 1650 cm$^{-1}$ (shoulder).

Preparation C—Dicyclohexyl amide (FIG. 3, $R_1$ and $R_2$ are each cyclohexyl)

The reaction was carried out at the usual temperature (110° to 120° C.) for three hours, then the temperature was increased to 145° C. for four hours. The higher temperature was necessary to allow stirring of the reaction mixture which became an extremely viscous, dark red melt as the reaction proceeded. Also, after 5 hours reaction time, more dicyclohexyl amine (9 g, 0.05 mole) was added. Workup was the same as for A: ir 1705 cm$^{-1}$, 1610 cm$^{-1}$.

Preparation D—Diisopropyl amide (FIG. 3, $R_1$ and $R_2$ are isopropyl)

The flask containing only the 1,2,4-benzene tricarboxylic anhydride was first heated to 175° C. to melt the anhydride. A mixture of 111 g (1.1 mole) diisopropylamine and 250 g (2.5 mole) triethylamine was then added in portions over about 4 hours from an addition funnel at such a rate that refluxing was vigorous but controlled. Reaction temperature was gradually lowered to 150° C. during addition of the amines. This modified procedure was necessary because when the reaction was run in the usual manner (all the amines added at the start) the refluxing amines prevented the reaction mixture from reaching a temperature at which reaction would proceed at a practical rate. Subsequent reaction and workup were the same as for A: ir 1725 cm$^{-1}$, 1610 cm$^1$.

EXAMPLE 1

Copolyestercarbonate with 60 mole percent amide

A 2000 ml 4-neck flask was fitted with a mechanical stirrer, a phosgene inlet tube, a pH probe and a Claissen adaptor to which were connected a caustic inlet tube and a dry ice condenser. In the flask were mixed 85.5 g bisphenol-A (0.375 mole), 81 g of the diphenyl amide, preparation A above (0.225 mole), 1.05 ml triethylamine, 420 ml water and 350 ml methylene chloride. With slow stirring and pH controlled at 7 to 8, phosgene was introduced into the flask at 0.3 g/min. for 180 minutes. The stirrer speed was then increased and the pH was gradually raised from 9 to 10 at 190 minutes. Then 125 ml methylene chloride was added and the phosgene rate increased to 1.0 g/min. At 213 minutes total phosgenation time, the reaction was terminated. The resin layer was separated from the brine layer, diluted with 250 ml methylene chloride, then washed twice with 0.01N HCl and once with water and precipitated in 3×volume of methanol in a Waring blender. The resin had an IV of 0.684 and Tg of 195.1° C. and ir 1770 cm$^{-1}$, 1740 cm$^{-1}$, 1665 cm$^{-1}$ and 1595 cm$^{-1}$.

This basic procedure of Example 1 was used to prepare the following resins. Modifications in procedure were made several times in the two variables, phosgenation rate and methylene chloride level, when it appeared necessary in order to produce resin of satisfactory intrinsic viscosity. Generally, the slower the phosgenation rate or the lower the methylene chloride level, the better the reaction proceeded. Conditions are shown in the Table below. The quantity of methylene chloride added at the end of the reaction was variable, depending on the amount in the initial formulation and the resin intrinsic viscosity. Generally, only enough was added to allow stirring of the reaction mixture.

| 8.4 l | water |
| 6.0 l | methylene chloride |
| 21 ml | triethylamine |
| 3.4 g | sodium gluconate |
| 1710 g | (7.5 mole) bisphenol-A |
| 28 g | (0.187 mole, 2.5 mole %) p-tert. butyl phenol |
| 271 g | (0.75 mole, 10 mole percent) amide monomer |

The batch was phosgenated at 6 g/min. for 80 minutes at pH 6 to 8, then at 6 g/min. for 80 minutes at pH 9 to 10 (1080 g total, 10.9 moles). The brine layer was then checked for free BPA. The batch was then diluted with 7 l methylene chloride, the brine layer separated by centrifuge, and the resin layer washed with acid (30 ml conc. HCl in 4 l water) and twice with water (4 l). The resin was steam precipitated and dried on a fluid bed dryer to about 240° F.

B. 10 mole % amide copolyestercarbonate prepared by modification method utilizing splitting of dihydric phenol into two batches The procedure of A above was followed except that 910 g (4.0 moles) of bisphenol-A was added at the start and 800 g (3.5 mole) of bisphenol-A was added at the end of the low pH phosgenation. Phosgenation was at 6 g/min. at pH 6 to 8 for 50 minutes, then at 24 g/minute at pH 9 to 10 for 25 minutes (1100 g. total, 11.1 moles).

C. 20 mole % amide copolyestercarbonate. Formulation was as follows:

| 8.4 l | | water |
| 6.0 l | | methylene chloride |
| 21 ml | | triethylamine |
| 3.4 g | | sodium gluconate |
| 1710 g | (7.5 mole) | bisphenol-A |

TABLE I

REACTION CONDITIONS FOR PREPARATION OF THE AMIDE SIDE GROUP RESINS AND PROPERTIES OF THE RESINS

| RESIN | FORMULATION | BATCH SCALE (MOLE) | PHOSGENATION RATE g/min. | INITIAL CH$_2$Cl$_2$ ml | RESIN IV dl/g AT 25° C. IN METHYLENE CHLORIDE | Tg °C. |
|---|---|---|---|---|---|---|
| 1 | 50 mole % A* no end-cap | 0.25 | 0.5 | 350 | 0.506 | 191.3 |
| 2 | 50 mole % B no end-cap | 0.25 | 0.5 | 350 | 1.62[1] | 188.9 |
| 3 | 60 mole % A no end-cap | 0.375 | 0.3 | 525 | 0.497 | 190.9 |
| 4 | 60 mole % A no end-cap | 0.375 | 0.3 | 350 | 0.684 | 195.1 |
| 5 | 50 mole % C 0.5 mole % t-butyl phenol | 0.375 | 0.3 | 350 | 0.456 | 199.6 |
| 6 | 60 mole % C no end-cap | 0.375 | 0.3 | 300 | 0.731 | 205.2 |
| 7 | 50 mole % D 2.0 mole % t-butyl phenol | 0.375 | 0.3 | 300 | 0.622 | 189.0 |
| 8 | 60 mole % D no end-cap | 0.375 | 0.3 | 300 | 0.425 | 190.2 |

[1]Reduced viscosity at 0.4 g resin/100 ml CH$_2$CL$_2$ at 25° C.
*Each of the letters refer to the same amide monomer prepared in the Preparation section

EXAMPLE 2

The following resins were made with preparation A, diphenylamide, as the amide.

A. 10 mole % amide copolyestercarbonate
The formulation of the batch was as follows:

| 28 g (0.187 mole, 2.5 mole %) | p-tert-butyl phenol |
| 542 g (1.5 mole, 20 mole %) | amide co-monomer |

The batch was phosgenated at 6 g/min. for 80 minutes at pH 6 to 8, then at 6 g/min. for 80 minutes at pH 9 to 10 (1080 g total, 10.9 moles). The brine layer was then checked for free BPA (50 ppm). The batch was then diluted with 7 l methylene chloride, the brine layer separated by centrifuge, and the resin layer washed with acid (30 ml conc. HCl in 4 l water) and twice with water (4 l). The resin was steam precipitated and dried on a fluid bed dryer to about 240° F.

EXAMPLE 3

The resins of Example 2 were extruded at 500° F. with 0.03 parts each of a phosphite and an epoxy stabilizer and molded at 600° F. into testing samples of dimensions 2.5 by 0.25 by 0.5 inches. The Tg, Flexural Yield, and Flexural Modulus were measured. The I.V. is measured in methylene chloride at 25° C.

| EXAMPLE | FLEXURAL YIELD psi | FLEXURAL MODULUS psi | I.V. | Tg °C. |
|---|---|---|---|---|
| Bisphenol-A Polycarbonate (Control) | 14,300 | 342,000 | 0.49 | 150° C. |
| 2A | 15,500 | 370,000 | 0.566 | 160.0 (163.6)* |
| 2B | 15,000 | 376,000 | 0.542 | 160.2 (162.8)* |
| 2C | 16,400 | 390,000 | 0.573 | 165.0 (170.8)* |

*Tg measured after sample redissolved in methylene chloride and then solvent precipitated in methanol, following precipitation procedure of Example 1.

What is claimed is:

1. A composition comprising an aromatic copolyestercarbonate having an improving effective amount of ester units of the structure

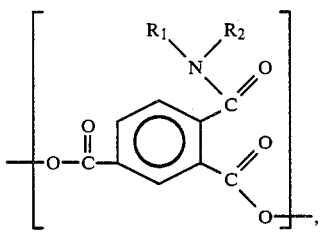

FIG. 1

-continued

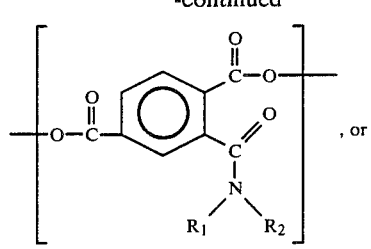

FIG. 2 or mixtures of the above two structures wherein $R_1$ and $R_2$ are the same or different and are alkyl of one to six carbon atoms, inclusive, cycloalkyl of four to seven carbon atoms, inclusive, phenyl, one to three alkyl substituted phenyl each alkyl having one to three carbon atoms, inclusive, or $R_1$ and $R_2$ taken together with the nitrogen to which they are attached form a ring of four to six carbon atoms, inclusive, or carbazole.

2. The composition in accordance with claim 1 wherein $R_1$ and $R_2$ are phenyl.

3. The composition in accordance with claim 1 wherein $R_1$ and $R_2$ are cyclohexyl.

4. The composition in accordance with claim 1 wherein $R_1$ and $R_2$ are isopropyl.

5. The composition in accordance with claim 1 wherein $R_1$ and $R_2$ taken together with the nitrogen to which they are attached is carbazole.

6. The composition in accordance with claim 1 wherein the aromatic copolyestercarbonate is derived from bisphenol-A.

7. The composition in accordance with claim 6 wherein $R_1$ and $R_2$ are the same and are phenyl, cyclohexyl, isopropyl or $R_1$ and $R_2$ taken together with nitrogen are carbazole.

8. The composition in accordance with claim 6 wherein the amount of ester units are from about five to sixty mole percent of the bis-phenol-A of the aromatic copolyestercarbonate.

9. The composition in accordance with claim 8 wherein the amount of ester units are from about ten to fifty mole percent of the bisphenol-A of the aromatic copolyestercarbonate.

10. The composition in accordance with claim 9 wherein $R_1$ and $R_2$ are the same and are phenyl, cyclohexyl, isopropyl or $R_1$ and $R_2$ taken together with the nitrogen to which they are attached is carbazole.

* * * * *

UNITED STATES PATENT AND TRADEMARK OFFICE
CERTIFICATE OF CORRECTION

PATENT NO.  : 4,622,379
DATED       : November 11, 1986
INVENTOR(S) : Niles R. Rosenquist It is certified that error appears in the above-identified patent and that said Letters Patent are hereby corrected as shown below:

Column 2, line 53, Figure 5 has been omitted.

After Figure 4 – should read – with the amine $HNR_1R_2$

Figure 5

Signed and Sealed this

Sixteenth Day of February, 1988

Attest:

DONALD J. QUIGG

Attesting Officer

Commissioner of Patents and Trademarks